Patented July 4, 1950

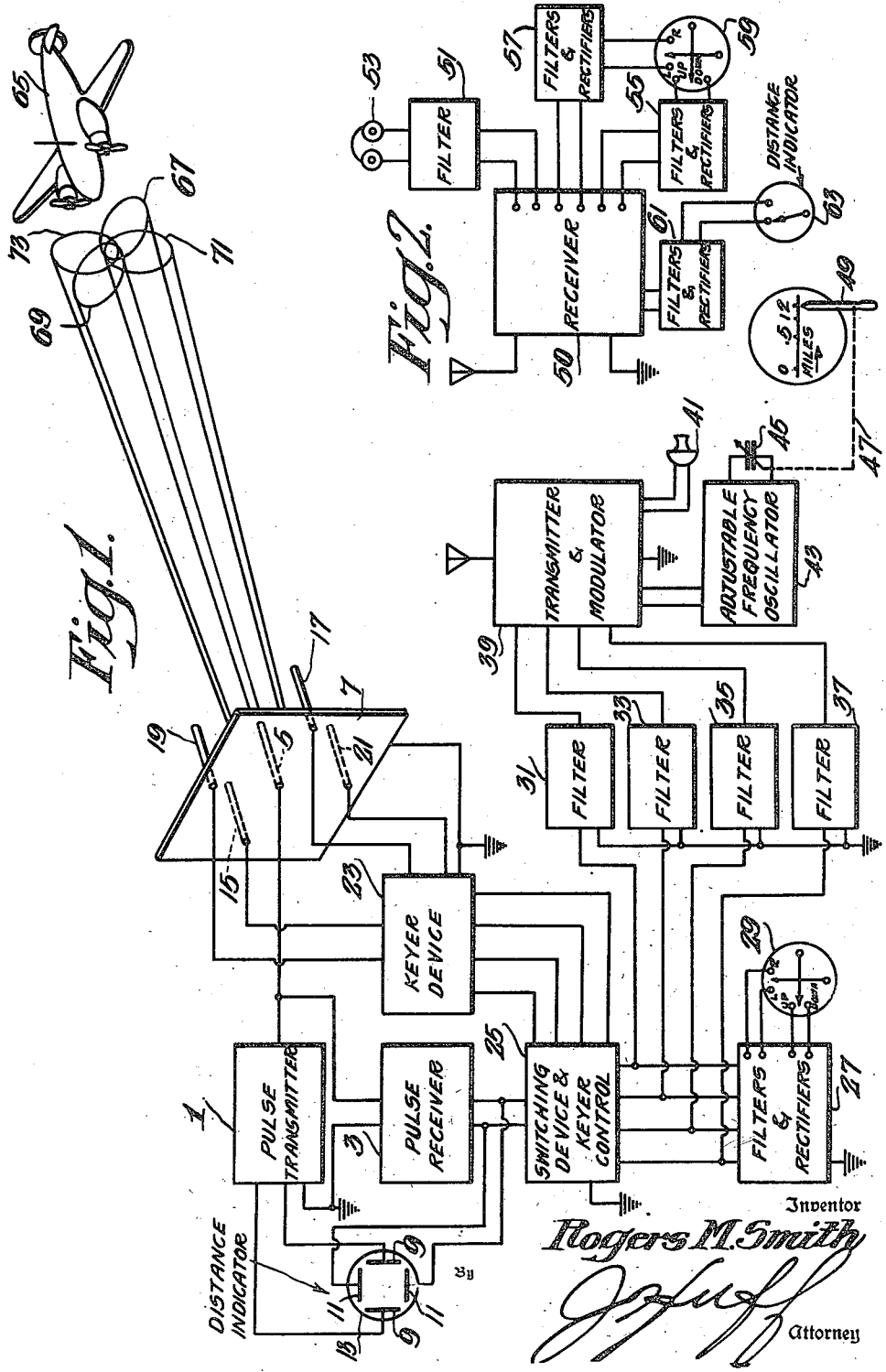

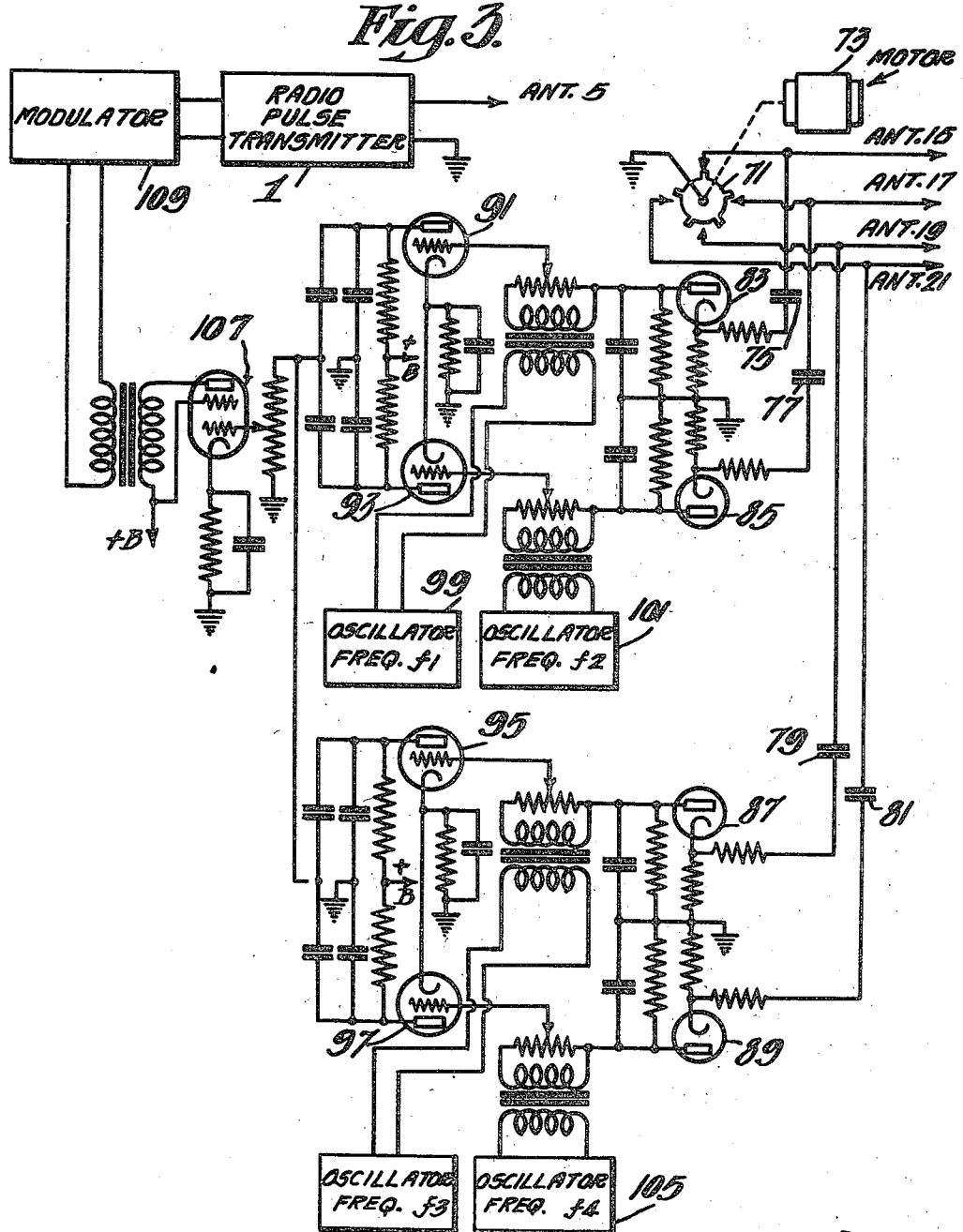

2,514,351

UNITED STATES PATENT OFFICE 2,514,351

AIRCRAFT LANDING SYSTEM EMPLOYING LOBE SWITCHING OF RADIO BEAMS

Rogers M. Smith, Merchantville, N. J., assignor to Radio Corporation of America, a corporation of Delaware Application January 3, 1940, Serial No. 312,273

12 Claims. (Cl. 343—11)

1

This invention relates to an apparatus for and a method of the landing of aircraft, and more specifically to a radio system in which an aircraft guiding path is established by a pulse transmitter so arranged that radiated pulses are reflected by the aircraft.

Numerous radio systems have been proposed for the landing of aircraft. In one such system overlapping radio frequency fields establish a runway localizer path which coincides with the runway of the landing field. The angle of radiation of these fields is so arranged that an equal signal glide path may be followed by the craft for landing. Furthermore, in systems of this type one or more boundary or distance markers are provided. These markers provide suitable indications of the distance to the landing field.

Another system has been suggested in which a radio transmitter is operated on the aircraft. Signals from this transmitter actuate a pair of directional receivers, a boundary marker receiver and a glide path receiver. Signals derived from the three receivers are used to modulate a broadcast transmitter. Signals from the broadcast transmitter are received on the airplane to provide suitable indications of the attitude of the plane with respect to the runway.

While the foregoing systems may be used in conjunction with properly equipped aircraft, they are not well suited to aircraft which are not provided with one or more special receivers, perhaps a transmitter, and indicating instruments.

It is an object of the present invention to provide means for indicating the position of an aircraft with respect to a runway and its distance therefrom. It is another object to provide means whereby a pulse transmitter may be used to establish a beam so that aircraft flying in the beam reflect pulses which indicate the position and distance of the aeroplane with respect to a reference line. An additional object is to provide an apparatus for and a method of advising the operator of an aircraft of its position whereby an instrument landing may be effected. A still further object is to provide means for establishing an aircraft landing path so arranged that reflected signals indicate the position of the craft and for relaying this information to the operator of the craft by means of a second radio transmitter.

The invention will be described by referring to the accompanying drawing in which Figure 1 indicates the radio transmitter and receiving apparatus, Figure 2 indicates the radio receiver which is used on the aeroplane, and Figure 3 is a schematic diagram of a keyer and modulator for the antenna array.

A pulse transmitter 1 and a pulse receiver 3 are connected to an antenna 5. The antenna 5 is mounted on a reflecting surface 7 and is preferably of a length long compared to the transmitted wave length. The pulse transmitter and pulse receiver are connected respectively to horizontal and vertical deflecting electrodes 9 and 11, respectively, of a cathode ray tube 13. The cathode ray tube is used as a distance indicator. Inasmuch as the details of this type of system are well known to those skilled in the art, no detailed description is necessary. For the sake of convenience, reference is made to U. S. Patent 2,401,717 which issued on the application of Wolff and Hershberger, Serial No. 184,354, filed January 11, 1938, entitled "Signaling System." Reflecting antennas 15 and 17 are located on either side of the main antenna 5. A second pair of reflecting antennas 19 and 21 are located above and below the main antenna 5. These antennas are connected to a keying device 23 and to a keyer controller 25. The keyer device and keyer controller are so arranged that the reflector antennas are successively connected whereby the beam from the main antenna 5 is successively directed to the right and left and above and below its normal position. The overlapping portion of the fields forms a glide and localizer path for aircraft.

The switching device 25 is also connected to the receiver 3 and to two pair of filters and rectifiers 27. The output of each pair of filters and rectifiers is differentially applied to a crossed pointer indicator 29. The switching device 25 is also connected to four filters 31, 33, 35 and 37 which may be omitted by using the receiver filter 27. The several filters 31, etc., are connected to a second transmitter 39. This transmitter and modulator may be of the type now employed for communicating with aeroplanes or for broadcasting weather reports. In addition to the filters 31, 33, 35, 37, the transmitter and modulator 39 has connected to it a microphone 41 and an adjustable frequency oscillator 43. The oscillator frequency may be varied by a variable capacitor 45 or the like which is coupled by means of a link 47 to a lever and pointer 49 which is used to follow the distance indications of the cathode ray tube 13.

In the aircraft radio receiver, a conventional instrument 50 of the superheterodyne or radio frequency type may be employed, the output being applied through a filter 51 to telephone receivers 53. If visual indications are desired, the receiver output may also be applied to two pairs of filters and rectifiers 55 and 57, the output of each pair being differentially connected to a crossed pointed indicator 59. For distance indication the output of the receiver is connected to an additional filter and rectifier 61 which is in turn connected to a distance indicator 63 which is preferably a frequency indicator calibrated in terms of distance as will hereinafter appear. One suitable frequency meter is disclosed in the copending application of Royden C. Sanders, Jr., Serial No. 248,577, filed December 30, 1938, for Frequency Meters, which is now U. S. Patent 2,228,367.

The operation of the system is as follows:

The pulse transmitter radiates ultra high frequency energy during pulse intervals of the order of one tenth to one half of a micro-second at a repetition rate of the order of 20,000 pulses per second. If none of the reflector antennas were energized or connected the long wave antenna 5 would establish a sharply defined beam of energy which would be reflected by an approaching airplane 65. If, by way of example, the antenna 15 is keyed by a distinctive signal, the radiated beam 67 will be directed to the right. If the antenna 17 is energized, the beam 69 will be directed toward the left. In a like manner by energizing the antennas 19 and 21, the beam will be reflected respectively downward to a position indicated by the reference numeral 71 and upwardly to the position indicated by the reference numeral 73. The intersection of the four radiation patterns 67, 29, 71 and 73 corresponding to the successive positions of the beam in the four quadrants will provide a glide path for the approaching craft. The reflected signals, if the craft is on the guide path will contain equal amounts of the four distinctive signals which appear as modulations on the radio beam carrier wave.

The demodulated products of the thus reflected and received signals will act equally and oppositely in pairs on the indicator pointers of the instrument 29. At the same time the reflected signals will indicate distance in the cathode ray tube 13. The distance indication is produced by initiating the horizontal scanning of the cathode ray in synchronism with the transmission of the outgoing pulses. The vertical deflection of the ray, caused by the reflected signals indicates the distance of the reflecting object as a function of the time required for the pulse to travel from the transmitter to the object and back to the receiver.

Thus, the position of the aircraft on the guide path and its distance from the transmitter are indicated to an observer at the ground station. In the event that the aircraft is off the course and within any one or more of the radiation patterns 67, 69, 71, 73, a distinctive modulation signal will be received. The received signal will cause the crossed pointer device 29 to indicate whether the aircraft is to the left or right or up or down with respect to the desired glide path.

While all of the foregoing information may be transmitted to the operator of the aircraft by means of speech signals applied to the microphone 41, it is desirable to indicate automatically to the aircraft operator the position of the craft with respect to the glide path. This may be done by modulating the second transmitter 39 with the received signals after their demodulation. The signals from the thus modulated second transmitter are received on the aircraft where they may be applied as described above to the indicator 59.

A visible indication of the distance of the craft is obtained automatically by following the horizontal deflection of the cathode ray beam by means of a pointer 49. This pointer is connected to the variable element 45 of the oscillator 43 whereby a distinctive frequency is transmitted as a function of the distance indication. This distinctive frequency is preferably sufficiently removed from the other modulation frequency so that it may be separated therefrom and applied to the frequency type indicator 63 which is calibrated in terms of any suitable units indicating distance.

One other type of information may be supplied to indicate the rate of approach of the craft. This information may be obtained by observing the rate of change of the reflected pulses as described in detail in the copending application of Smith Serial No. 293,133, filed September 1, 1939, now Patent No. 2,492,012, granted December 20, 1949. This information may be conveyed to the aircraft operator by means of the microphone 41, or it may be applied in a manner similar to that in which the distance indication is transmitted automatically.

While it does not appear necessary to describe the method of applying the distinctive modulation of the radio beam carrier, in view of the known systems for directing aircraft, reference is made to D. S. Bond's U. S. Patent 2,238,965, in which such methods are described. It should be understood that the distinctive modulation may be arranged in pairs of complementary telegraphic systems such as A—N and E—T. The telegraphic signals are preferably modulated by audio-frequencies of the order of 60, 70, 80 and 90 cycles per second whereby the signals may be readily filtered and applied to the indicating meters. It should be understood that the telegraphic characters may be entirely omitted in favor of the distinctive frequency method of marking the respective beams, as shown in Fig. 3.

Referring to Fig. 3, the keyer 71 is driven by a motor 73 so that the antennas 15, 17, 19 and 21 are successively grounded, whereby they become reflectors. As each reflector antenna is grounded, currents are induced from the central antenna current. The induced currents are applied through capacitors 75, 77, 79 and 81 to rectifiers 83, 85, 87 and 89, respectively. These currents are rectified by the rectifier to which they are applied. The rectified currents are used to bias positively the control grids of the amplifiers 91, 93, 95 and 97, respectively. Since these amplifiers are normally biased to cut-off, they are incapable of transmitting modulating currents from the four local oscillators 99, 101, 103 and 105, which are operated at different frequencies.

As each of the antennas is successively energized and the currents therefrom rectified to bias the amplifiers into an operating condition, the distinctive modulation frequency currents are applied through the amplifier 107 to the modulator 109 which is connected to the pulse transmitter 1. The output from the pulse transmitter is applied to the central antenna 5 so that the resultant beam is distinctively modulated and at the same time moved up or down, or right or left by the grounded reflector, to establish four regions marking the glide path for the airplane.

No attempt has been made to describe in detail the biasing voltages and circuit connections of the modulator and keyer system, inasmuch as a complete description of the mode of operation will be found in Bond U. S. Patent 2,238,965.

Thus, the invention has been described as an apparatus method for landing aircraft. A pulse transmitter is used to establish overlapping beams to thereby form a glide path. The reflected signals indicate the position and distance of the craft with respect to the transmitter and glide path. The information, thus obtained, may be relayed to the aircraft operator by a second transmitter whose signals are received by a conventional receiving device. The receiving device may include visual indicators. This system has the distinct advantage of placing all of the heavy equipment on the ground and it employs the conventional receiver which is generally installed on aircraft.

I claim as my invention:

1. An aircraft instrument landing system including a radio transmitter for transmitting pulses, means for radiating said pulses in the form of a beam, means for directing said beam up and down and right and left sequentially so that overlapping portions of said directed beam form a glide path, means for modulating said beam in each of its respective positions with signals of distinctive frequencies, a receiver responsive to said modulated beam signals after said signals are reflected from an aircraft in said beam, filters respectively responsive to said distinctive modulation connected to said receiver for selecting said distinctive signal modulation, a second radio transmitter, and means connecting said second transmitter and said receiver for applying said selected distinctive modulation signals to modulate said second transmitter for transmission of said modulation signals to said aircraft.

2. In the system described in claim 1 an indicator connected to said filters for indicating the relative strengths of the signals reflected by said beam in its respective up-down and left-right positions.

3. The system described in claim 1 including a receiver located in said aircraft responsive to the signals from said second transmitter for indicating the position of the aircraft reflecting the signals from said pulse transmitter, said receiver comprising filters responsive to said distinctive frequency modulation signals, respectively, and an indicator means connected to said filters for comparing the signal strength of the filter outputs.

4. An aircraft landing system including, in combination, a pulse transmitter, means for radiating said pulses in a beam shape path, means for directing said beam up and down and left and right sequentially so that an overlapping portion forms a predetermined glide path, means operated in synchronism with said beam directing means for further distinctively modulating said beam in each of its respective positions, a receiver responsive to pulses reflected by an aircraft in said beam, selector means connected to said receiver and selectively responsive to said distinctive reflections, indicators connected to said receiver and to selector means for indicating respectively the time between radiation and reception of a reflected pulse and for indicating the ratio of reflected signals from said beam in its respective up-down and left-right positions, a second transmitter, and means for applying the received reflected distinctively modulated signals to modulate said second transmitter.

5. In a system such as described in claim 4 means for generating the signals which vary as a function of the time between radiation of a pulse and its reception after reflection, and means for modulating said second transmitter with said signals.

6. In a system of the type described in claim 4, a receiver responsive to the signals from said second transmitter located on the aircraft reflecting said pulse signals for indicating to the operator of the aircraft its position with respect to said glide path.

7. In a system of the type described in claim 4, means for generating the signals which vary as a function of the time between radiation of a pulse and its reception after reflection and means modulating said second transmitter with said generated signals so that its signals include distance information and a receiver selectively responsive to the signals from said second transmitter located on the aircraft reflecting said pulse signals for indicating to the operator of the aircraft its position with respect to said glide path and its distance from said radiation means.

8. An aircraft instrument landing system including a pulse transmitter, means for radiating said pulses in a sharply defined beam, means for directing said beam up and down and right and left so that the resultant beam positions overlap and form a landing guide path for aircraft, means for modulating said beam in each of its respective positions with a distinctive signal different from that of all other positions, a receiver responsive to said pulse signals reflected from an approaching aircraft, a distance indicator connected to said receiver and operated as a function of the time between transmission and reception of a reflected pulse, means connected to said receiver and responsive thereto to reproduce said distinctive signals at relative amplitudes depending upon the strengths with which they are received, a second transmitter, means applying said reproduced signals to said second transmitter to modulate the radiations from the latter, a local adjustable frequency oscillator connected to said second transmitter and including means for varying the frequency as a function of the distance indicated on said distance indicator.

9. An instrument landing system for aircraft comprising means for radiating pulses in a radio beam, means for directing said beam up and down and right and left to form an overlapping region, means for distinctively carrier wave modulating said beam in each of its respective positions, means for receiving said distinctively modulated beams after reflection from an aircraft, said receiving means including means for selecting the distinctive modulations, means for radiating a carrier wave to the aircraft reflecting the pulses, means for modulating said carrier wave with distinctive signals corresponding to said selected signals, means for receiving said modulated carrier on the aircraft reflecting the pulses, means for demodulating said received carrier to obtain said distinctive signals, and means for comparing said distinctive signals to indicate the position of said aircraft as a function of said distinctive signals of said carrier.

10. An instrument landing system for aircraft comprising means for radiating pulses in a beam, means for directing said beam up and down and right and left to form an overlapping region, means operating synchronously with said beam directing means for distinctively carrier wave modulating said beam in each of its respective positions by signals of different frequencies, means for receiving said distinctively modulated beams after reflection from an aircraft, said receiving means including means for selecting the distinctive modulation signals, means for radiating a carrier wave to the aircraft reflecting the pulses, means for modulating said carrier wave with distinctive signals corresponding to said selected signals, means for receiving said modulated carrier on the aircraft reflecting the pulses, means for demodulating said received carrier to obtain said distinctive signals, and means for comparing the relative magnitudes of said distinctive signals to indicate the position of said aircraft as a function of said distinctive signals of said carrier.

11. An instrument landing system for aircraft comprising means for radiating pulses in a beam, means for directing said beam up and down and right and left to form an overlapping region, means for distinctively carrier wave modulating said beam in each of its respective positions, means for receiving said distinctively modulated beams after reflection from an aircraft, said receiving means including means for selecting the distinctive modulations, means for comparing the selected signals to indicate the position of the craft with respect to said overlapping region, means for radiating a carrier wave to the aircraft reflecting the pulses, means for modulating said carrier wave with distinctive signals corresponding to said selected signals, means for receiving said modulated carrier on the aircraft reflecting the pulses, means for demodulating said carrier to obtain said distinctive signals, and means for indicating the position of said aircraft as a function of said distinctive signals of said carrier.

12. An instrument landing system for aircraft comprising means for radiating pulses in a beam, means for directing said beam up and down and right and left to form an overlapping region, means for distinctively carrier wave modulating said beam by audio frequency signals in each of its respective positions, means for receiving said distinctively modulated beams after reflection from an aircraft, said receiving means including means for selecting the distinctive modulations, means for comparing the relative magnitudes of the selected signals to indicate the position of the craft with respect to said overlapping region, means for timing the interval between the radiation of a pulse and its reception after reflection to indicate the distance of the aircraft reflecting said pulse, means for radiating a carrier wave to the aircraft reflecting the pulses, means for modulating said carrier wave with distinctive signals corresponding to said selected signals, means for receiving said modulated carrier on the aircraft reflecting the pulses, means for demodulating said carrier to obtain said distinctive signals, and means for indicating the position of said aircraft as a function of said distinctive signals of said carrier.

ROGERS M. SMITH.

REFERENCES CITED

The following references are of record in the file of this patent:

UNITED STATES PATENTS

| Number | Name | Date |
|---|---|---|
| 2,055,883 | Terry | Sept. 29, 1936 |
| 2,062,003 | Hammond | Nov. 24, 1936 |
| 2,063,534 | Wallace | Dec. 8, 1936 |
| 2,160,913 | Scharlau et al. | June 6, 1939 |
| 2,165,256 | Hansell | July 11, 1939 |
| 2,172,395 | McSpadden | Sept. 12, 1939 |
| 2,176,469 | Moueix | Oct. 17, 1939 |
| 2,226,930 | Hefele | Dec. 31, 1940 |
| 2,238,965 | Bond | Apr. 22, 1941 |
| 2,252,083 | Luck | Aug. 12, 1941 |
| 2,267,715 | Bowen | Dec. 30, 1941 |
| 2,277,464 | Taylor | Mar. 24, 1942 |
| 2,287,786 | Diamond et al. | June 30, 1942 |
| 2,312,747 | Bond | Mar. 2, 1943 |
| 2,403,622 | Tuska | July 9, 1946 |
| 2,412,702 | Wolff | Dec. 17, 1946 |